United States Patent [19]
Hotaling

[11] Patent Number: 5,157,929
[45] Date of Patent: Oct. 27, 1992

[54] METHOD FOR PRODUCING CLEAR AND PATTERNED ICE PRODUCTS

[76] Inventor: William E. Hotaling, 86 Woodlawn Ave., Saratoga Springs, N.Y. 12866

[21] Appl. No.: 748,245

[22] Filed: Aug. 21, 1991

[51] Int. Cl.⁵ .............................................. F25C 1/16
[52] U.S. Cl. ......................................... 62/66; 62/100; 55/55
[58] Field of Search ........................... 62/100, 268, 66; 55/189, 55

[56] References Cited

U.S. PATENT DOCUMENTS

| | | | |
|---|---|---|---|
| 208,304 | 9/1878 | Gamgee | 55/189 X |
| 828,887 | 8/1906 | Hoofnagle | 62/268 X |
| 2,718,124 | 9/1955 | Gilliam | 62/106 |
| 3,116,999 | 1/1964 | Armbruster | 55/189 X |
| 3,146,606 | 9/1964 | Grimes et al. | 62/233 |
| 3,264,844 | 8/1966 | Kesling | 62/344 |
| 3,451,227 | 6/1969 | Jacobs et al. | 62/345 |
| 3,791,166 | 2/1974 | Maleck | 62/138 |
| 4,287,941 | 9/1981 | Allen | 55/189 X |
| 4,292,816 | 10/1981 | Gartzke | 62/345 |
| 4,322,226 | 3/1982 | Hudec | 55/189 X |
| 4,530,214 | 7/1985 | Ellsworth et al. | 62/71 |
| 4,845,954 | 7/1989 | Johansson | 62/100 X |
| 4,979,370 | 12/1990 | Hotaling | 62/70 |

*Primary Examiner*—William E. Tapolcai
*Attorney, Agent, or Firm*—Schmeiser, Morelle & Watts

[57] ABSTRACT

An improved process for creating clear ice products and ice products with patterns. Purified water placed in a container having an inlet is deoxygenated by at least 20% by the use of a vacuum through the inlet. The container is then either sealed to prevent the reintroduction of the oxygen into the water or the water is frozen in a ice cube tray on a plate evaporator between −20° and 30° F. The variations in the water temperature at the time the vacuum is applied and when the water is placed in the freezer effect the patterns obtained in the ice products.

10 Claims, 1 Drawing Sheet

METHOD FOR PRODUCING CLEAR AND PATTERNED ICE PRODUCTS

FIELD OF THE INVENTION

Generally, this invention relates to the production of ice products. More specifically the invention is a method for producing ice products that are either clear or have a pattern within them. The subject invention utilizes variations in water temperature, negative pressure across the surface of the water and various freezing temperatures in order to accomplish particular types of patterns within the ice as well as clear ice.

BACKGROUND OF THE INVENTION

There has always been a significant market for clear ice products because of both their appearance and better taste. The desire for such products has increased as people have become more aware of the fact that water contains many impurities and can negatively effect the taste of drinks and the like. In the industry of water products there has been significant growth in the area of sales of bottled water and water purifiers. Accordingly, people are also looking more carefullY at their ice products to assure the ice does not contaminate their drinks. However, even where purified water is used to make ice products the typical ice cube is very cloudy and does not give one the sense of a pure and clean product.

On a commercial level, clear ice is used for ice sculptures for many occasions. However, due to the present methods for preparing clear ice products, these items are quite costly. Furthermore, there are presently no products or processes available that enable a user to make clear ice at his/her home.

My previous U.S. Pat. No. 4,979,370, which is incorporated by reference into this application, discusses many of these factors and discloses what up till now has been the best method for creating clear ice. Prior to my application other inventions sought to create clear ice products by a variety of means. These processes included agitating the water as it was being frozen; directing air streams on the top of the water during freezing also to provide agitation; forming ice on moving paddles to prevent the entrapment of impurities and air bubbles; the use of centrifugal force for creating an oscillating movement during freezing; and forming ice pellets on orbitally moving freezing studs and then removing the composite for the created ice product after a suitable size had been obtained.

All of these approaches suffer from one common problem, namely the cost involved in treating the ice during the freezing process. Although my prior patent, which has been previously referenced, overcame many of these problems my process required the user to utilize specially designed apparatus in order to bubble nitrogen through the container prior to freezing. While this prior approach allowed for freezing in a regular container there were still additional, although greatly reduced over the prior art, costs involved in this pretreatment of the water.

SUMMARY OF THE INVENTION

While experimenting with my process for manufacturing clear and patterned ice products, as disclosed in my U.S. Pat. No. 4,979,370, I began altering the amount of nitrogen used in the deoxygenation process. During these experiments I made various determinations relative to the amount of nitrogen necessary to produce clear ice when the top of the container was simply open and the nitrogen/oxygen vented themselves after they had exited the water. I realized of course, that use of very minimal amounts of nitrogen had virtually no effect on producing a clear ice product and that one would obtain virtually the same product as when freezing water without any deoxygenation. I then began experimenting with the vacuum source which, in my prior patent, was used simply as an improvement that was applied to the opening in order to draw off the gases which were exiting through the top surface of the water during the bubbling of the nitrogen through the water. I then, rather serendipitously, discovered that when I increased the vacuum well beyond what was needed to draw off the nitrogen, my ice product became clearer and, depending upon the strength of the vacuum and the duration, previously unobtained patterns began developing with regular consistency. I began to realize that the strength and duration of the vacuum source were inversely proportional to the amount of nitrogen required. Although I could not explain this phenomenon I continued with my experimentation until I had completely eliminated the nitrogen source and found that I could still obtain clear and patterned ice products simply through the use of the vacuum. After further experimentation I found that these new results could be varied depending upon the temperature of the water at the time the vacuum was applied and the temperature of the freezer during the freezing of the water.

In my prior patent I believed that I was only venting the accumulated gases above the liquid in order to add to the total claritY. However, it appears now that even the minor vacuum I was using at that time may have been having an effect on the removal of the oxygen within the liquid.

Although I do not have any empirical data on this process it appears that the temperature of the water, can have a significant effect upon the amount of oxygen drawn out simplY through the vacuum process. Furthermore, depending upon the amount of oxygen drawn out the temperature of the compartment during freezing, and the type of freezer, the oxygen will begin to reenter the water during freezing in relatively specific patterns. If this reentry is kept to a minimum the ice product is virtually clear. However, when a greater amount of oxygen is drawn out of the water the oxygen tends to enter more quickly and if certain temperatures ranges are used the ice product delineates the reentering oxygen in the form of strands and minute air pockets.

I have therefore found that I am now able to avoid the need for any special pumping mechanisms for putting inert gases into the liquid thereby, reducing the cost of obtaining my finalized products. In addition, whereas the nitrogen or other inert gas in the water would block the reentry of the oxygen I was not able to obtain the type of patterned ice products that I am now able to obtain. Furthermore, the patterned ice products which I have now obtained can be repeated with great consistency as will be shown hereinafter.

I have also found that in addition to selling the final ice product the deoxygenated water of the present invention, if bottled an sealed shortly after the vacuum process, can provide a deoxygenated water product which is very suitable for home use.

This home water product acts in a manner which is opposite of what we normally experience with carbonated soda products and the like. Namely, after the bottle has been opened or if the bottle is left open the product will reoxygenate as equilibrium is obtained and the product will loose its effect. This may be viewed as the opposite of the occurrence experienced when the carbonation from soda leaves the soda and the soda becomes flat. To avoid this the water product should be of a size sufficient to only fill one or several ice cube trays at one time so that after use their is little or no water remaining in the bottle.

DETAILED DESCRIPTION OF THE PREFERRED EMBODIMENT

This invention relates to processes for deoxygenating water. For the purposes of this invention deoxygenation will mean the same as it did in my prior patent, namely the reduction of at least 20% of the oxygen content of the water being treated. Secondly this process combines this deoxygenated water with various freezing methods and temperatures in order to obtain particular ice products.

The first step of this process is to select an appropriate water source. In my preferred embodiment I use water which has been purified by means of reverse osmosis to remove all dissolved minerals. Nevertheless, one may choose to use distilled water or spring water. Acceptable results can even be obtained through the use of standard tap water. Of course, while deoxygenation improves the taste of the cube, this benefit may not be as readily ascertainable if regular tap water is used because of the high mineral and/or chlorine content commonly found in the tap water.

Figure 1:
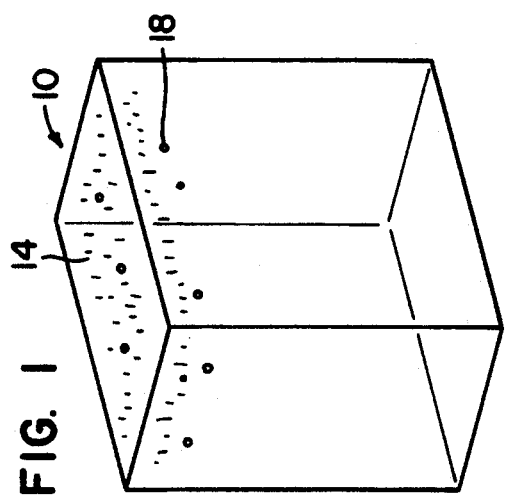
FIG. 1 is a elevational view of clear ice cube obtained through the use of my process using purified water.

In my preferred embodiment for obtaining clear ice, as shown in FIG. 1, I use water which has been purified by reverse osmosis. I then place approximately six cups in a container having a top with only a single outlet. I apply a vacuum at the outlet for 1 minute which vacuum is of a strength that is not so large as to draw the water into the vacuum. The vacuum pump and sealing system I use is called Food Saver, which is made by the Tilla Company and distributed by Nationwide Marketing of San Francisco, Calif. The vacuum is marked with U.S. Pat. No. 4,660,355. The water is then deposited into an ice cube tray and placed on a plate evaporator at 28o Fahrenheit. As shown in FIG. 1, the ice cube 10 has a bottom portion 12 which during freezing is closest to the plate evaporator. Coming down from the top 14 of the ice cube 10 one can see, if the ice cube is angled correctly, a number of very small thin strands and a few dispersed minute air pockets which I believe show the air reentering the water during the freezing process. It should be noted that the visual effect of the actual cube of FIG. 1 is that of a virtually clear ice cube with the severally displaced strands and minute air pockets 18 noticeable only upon close inspection. In this preferred embodiment the temperature of the water at the time of its being placed in the freezer was virtually room temperature, which in this case was approximately 70°.

I found during my experiments that when the water temperature was below 40° at the time of vacuuming and placement into the freezer, the resultant product was much less dramatic. I believe this was because the vacuum did not remove a sufficient amount of oxygen during the vacuum process. In addition, for some reason when the freezing process is sped up as it would be if the water were under 40° the strands become very dense and have a negative effect on the produot. I have also found that where the vacuum is applied for more than two minutes the final product contains too many air pockets and strands. I believe this is because deoxygenation beyond a certain point will cause too much of gradient and the air will reenter the water at a faster rate during the freezing process causing the excess number of strands and air pockets.

For the purposes of the invention it should be appreciated that a plate evaporator is a tray or shelf that has the cooling coils directly beneath it. This type of cooling provides a uniformity not obtainable in a regular freezer and aids in the uniformity of the final ice cube. However, a clear ice product, and designs similar to those obtained with a plate evaporator can be obtained in a regular freezer.

Figure 2:
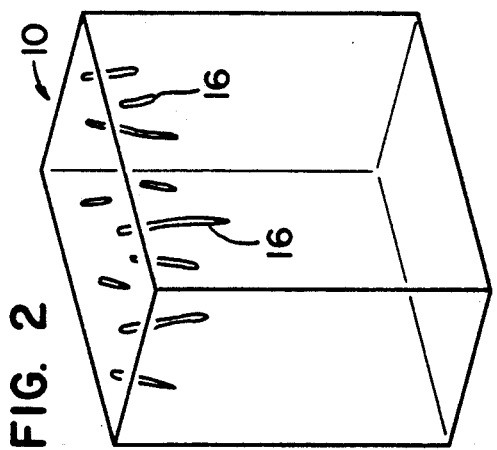
FIG. 2 is an elevational view of an ice cube using the same process but decreasing the freezing temperature using purified water.

The ice product as shown in FIG. 2 is obtained as a result of using purified water in my same vacuum process with the water being 75° upon vacuuming and placement into the freezer where the freezer is of a plate type. In this instance although the freezer is also a plate evaporator the temperature is −10° Fahrenheit. As can be seen the strands 16 are thicker yet they are still not so numerous as to significantly effect the appearance of the otherwise clear ice product. Once again, the use of the plate evaporator seems to result in the reentry of the air from the top down during freezing. I have found that water of a temperature of 65° to 80° is most suitable for obtaining a clear ice product.

Figure 3:
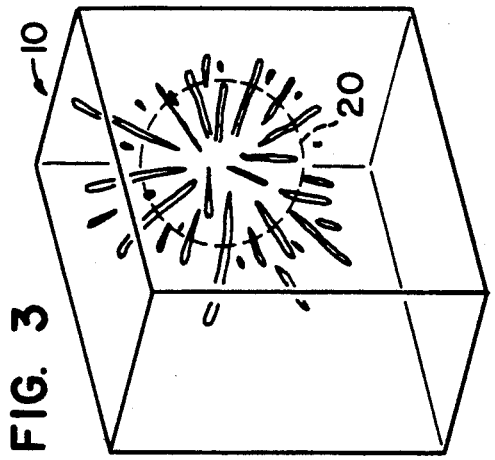
FIG. 3 is an elevational view of prior art ice cube using purified water without my process, and frozen in a standard refrigerator.
Figure 4:
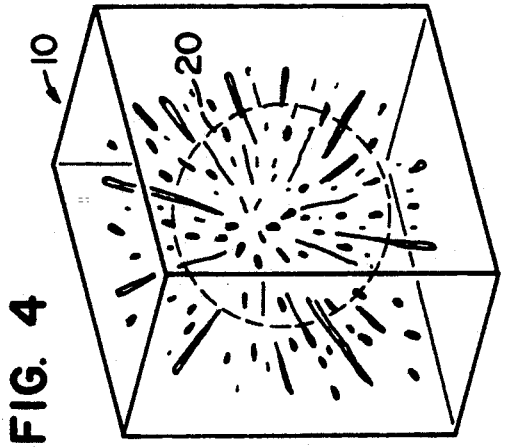
FIG. 4 is an elevational view of an ice cube commonly obtained in the prior art from the freezing of regular tap water.

FIGS. 3 and 4 show the prior art which is obtained by using a basic ice cube tray in a standard freezer that does not have a plate evaporator. The water in these cases has not been treated by my process and the difference between the two ice cubes is that in the FIG. 3 ice cube I used a purified water while the FIG. 4 ice cube uses standard tap water. One of the most notable aspects of the prior art is that the area defined by dotted lines 20 is a clouded bolus from which the strands extend.

Figure 5:
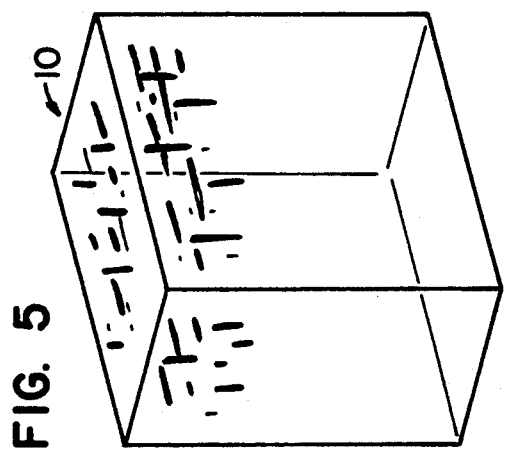
FIG. 5 is an elevational view of an ice cube utilizing deoxygenated water from my process with variations in the water temperature and the freezing temperature, using purified water.

The ice cube of FIG. 5 utilizes purified water, my vacuum process and is frozen on the plate evaporator at −10° Fahrenheit. However, the difference between this cube and the cube of FIG. 2 is that the FIG. 5 cube had the vacuum source supplied and was placed in the freezer when the water was approximately 115° F. For some reason this increased temperature always results in a combination of horizontal and vertical threads in the top 25 to 33% of the cube. The strands are larger as in the fast freezing in FIG. 2, however, there are more of them which I believe is due to the fact that the increased temperature of the water upon vacuuming causes a greater deoxygenation and therefore oxygen reenters the cube more quickly during freezing to achieve equilibrium thus causing the increase in strands. This influx of air into the cube meets with the substantial freezing effects of the plate evaporator which may then result in some horizontal movement of the air. While this does not accomplish a clear ice cube, it does create a very aesthetically pleasing and interesting design which due to the uniformity of my system provides quite a unique effect especially when combined with similar ice cubes.

Figure 6:
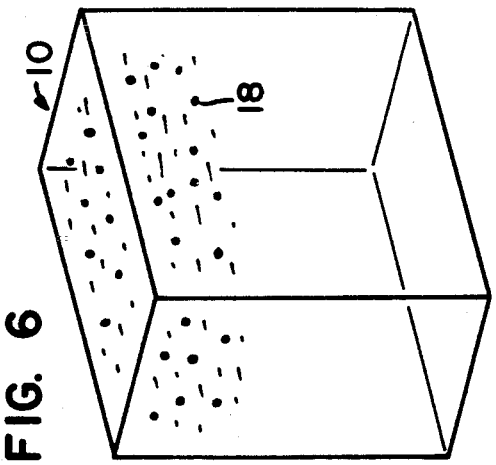
FIG. 6 is an elevational view of an ice cube using standard tap water that was put through my process.

The ice cube of FIG. 6 shows the use of my process with standard tap water. Although there is an increase in the impurities the strands only cover the top 25 to 33% of the ice cube and still create a substantially clear cube with an interesting design.

Generally stated the parameters of water purity, water temperature, and vacuuming time and strength all effect the final ice cube product. Broadly stated, freezing between 15° and 30° F. creates thinner strands which are less noticeable while freezing between −20° and 15° F. creates thicker strands which, depending on the other parameters may be aligned in an aesthetic fashion. The application of my process to water below 45° produces an undesirable result due to the multitude and thickness of the strands. I have found that the best clarity is obtained with water temperatures between 60° and 85°. However, temperatures of 85° to 130° F. provide a slightly enlarged area of oxygen reentry, assuming that the vacuum and freezing rates stay the same.

Application of the described vacuum for one minute for every six cups of water provides the optimum deoxygenation. Vacuum times less than twenty seconds or more than two minutes per six cups of water are unsuccessful, resulting in an unclear cube with too many strands and air pockets to even form what could be called a pattern.

In operation, water of a preselected purity is obtained and put within a container. The container has no functioning gas or liquid inlets below the water level so that when a vacuum is applied the oxygen is drawn out of this contained quiescent water supply. I prefer to apply the vacuum for one minute for each six cups of water to be frozen. This is most easily applied by connecting a hose from a vacuum pump to the single outlet located on the top of the container. The strength of the vacuum being sufficient to deoxygenate the water by at least 20% but not to a degree that would result in too quick of a reentry of air into the water supply to reestablish equilibrium. In addition, the vacuum is not of sufficient strength to draw the water out of the container.

After the vacuum is applied the container may be sealed and sold to consumers or may be frozen on sight for the production of commercial ice cubes. Where the water is frozen on sight I prefer to place the cube containers on a plate evaporator at 28o F If a particular coloring is required one may also add food coloring to give the ice cube a desired tint. Similarly, one could add flavoring if a particular taste is desired. Some flavorings can be utilized which will not significantly effect the clarity of the final ice product.

The final ice product, which is substantially clear, is then packaged for sale.

While the above describes the preferred embodiments of my invention, it should be appreciated that many variations may be made in the various parameters discussed to obtain unique and interesting ice products without departing from the scope of this invention. It is therefore intended that the scope of this invention be limited only by the appended claims.

I claim:

1. A method of making clear ice and ice with patterns therein comprising:
   selecting water with a predetermined purity level;
   housing said water within a container having at least one inlet;
   applying a vacuum through the container inlet for a predetermined period of time in order to remove a portion of the oxygen present in the water;
   maintaining the water within said container in a substantially unagitated state and at a predetermined temperature during said vacuum step; and
   freezing said water at a predetermined freezing temperature to obtain a substantially clear ice product containing a particular user controlled pattern of entrapped air in a portion theeof, said pattern dependent upon the specific combination of at least said purity level, said predetermined temperature, said predetermined period of time and said predetermined freezing temperature.

2. The invention of claim 1 wherein the maintaining step includes preventing the introduction of gas or liquid into the container during said vacuum step.

3. The invention of claim 1 including the step of adding food coloring after housign the water in a container.

4. The invention of claim 1 wherein the water is between 50° F. and 130° F. during the vacuuming process.

5. The invention of claim 1 wherein the vacuum applied is of a strength sufficient to withdraw at least 20% of the oxygen from the water supply.

6. The invention of claim 1 wherein the water is frozen between 15° and 30° F.

7. The invention of claim 1 wherein the water is frozen between −20° and 15° F.

8. A method for producing deoxygenated water for making clear ice and ice with patterns therein comprising:
   selecting water with a predetermined purity level;
   housing said water within a container having at least one inlet;
   applying a vacuum through the container inlet for a predetermined period of time in order to remove a portion of the oxygen present in the water;
   maintaining the water within said container in a substantially unagitated state and at a predetermined temperature during said vacuum step; and
   sealing the deoxygenated water within the container wherein said deoxygenated water, when frozen at a predetermined freezing temperature, produces a substantially clear ice product containing a particular user controlled pattern of entrapped air in a portion thereof, said pattern dependent upon the specific combination of at least said purity level, said predetermined temperature, said predetermined period of time and said predetermined freezing temperature.

9. The invention of claim 8 wheren the maintaining step includes preventing the introduction of gas or liquid into the container during said vacuum step.

10. The invention of claim 8 wherein the water is between 50° F. and 130° F. during said vacuuming process.

* * * * *